May 30, 1950
J. W. SAVIN ET AL
2,509,316
METHOD AND APPARATUS FOR DETERMINING PLUGGING
OF OIL RINGS OF INTERNAL-COMBUSTION
ENGINES USING A RADIAL LIGHT BEAM
Filed Sept. 8, 1947
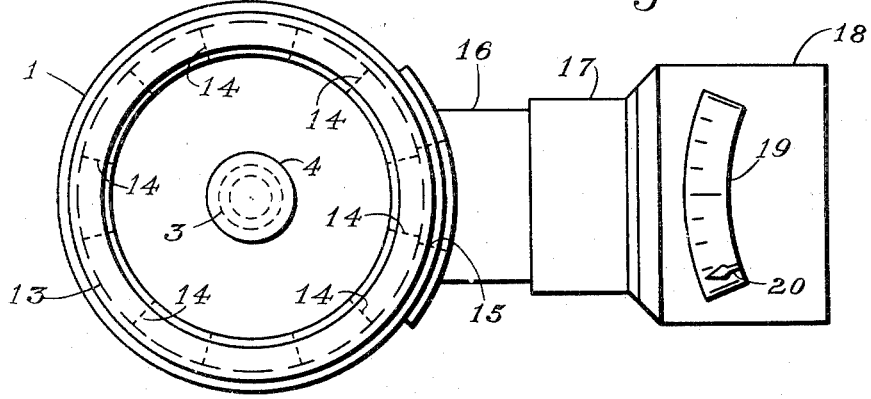
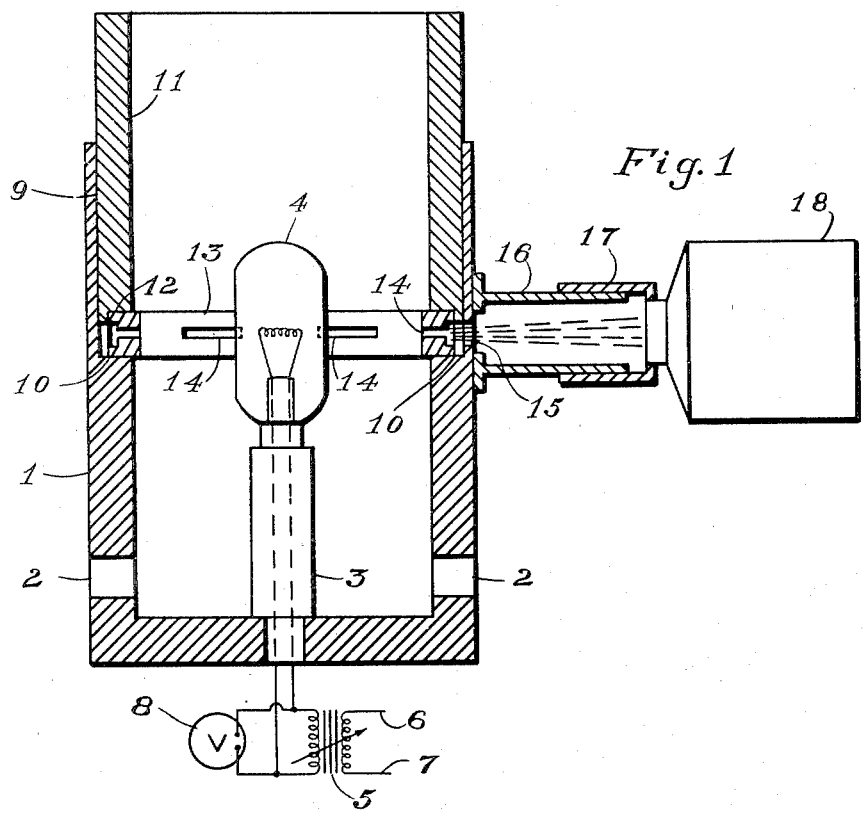

Patented May 30, 1950

2,509,316

UNITED STATES PATENT OFFICE 2,509,316

METHOD AND APPARATUS FOR DETERMINING PLUGGING OF OIL RINGS OF INTERNAL-COMBUSTION ENGINES USING A RADIAL LIGHT BEAM

James W. Savin, Collingswood, N. J., and John H. Neithammer, Brookline, Pa., assignors to The Atlantic Refining Company, Philadelphia, Pa., a corporation of Pennsylvania Application September 8, 1947, Serial No. 772,834

3 Claims. (Cl. 88—14)

The present invention relates to a method and apparatus for determining the degree of plugging of piston rings, and particularly of the oil rings of internal combustion engines.

The oil rings of internal combustion engines are generally provided with a plurality of apertures of rectangular or circular cross-section extending through the rings to permit drainage of lubricating oil from the cylinder wall and return of the oil to the engine crankcase. After an extended period of operation, carbonaceous materials resulting from the combustion of the engine fuel and from the oxidation of the lubricating oil, tend to deposit in the oil ring grooves and the apertures, thus blocking the apertures and preventing the return of oil to the crankcase. This, in turn, causes "pumping" of the oil past the oil rings and the compression rings into the combustion section of the engine cylinders and results in increased oil consumption.

In order to determine the degree of ring plugging through deposition of carbonaceous materials or sludge, there is provided in accordance with this invention, a novel and inexpensive method and apparatus for readily accomplishing this result.

Briefly, the method comprises providing a light source of constant intensity, passing the light through the oil ring apertures, measuring the amount or intensity of the light transmitted, and comparing the measurement with that obtained by passing light through the unobstructed apertures of the same oil ring after removal of the deposited material. Since the amount of light passed through the oil ring apertures is inversely proportional to the amount of blockage, a comparison of the values readily gives the percentage ring plugging. Use of the same ring after removal of the deposited material, as a blank, is preferred since the use of a new ring of the same dimensions as a blank occasionally introduces an error, probably due to the difference in light transmission.

The present invention may be further understood with reference to the accompanying drawing, in which Figure 1 is a side view, partly in section, of apparatus for carrying out the method, and Figure 2 is a top elevation of the apparatus of Figure 1.

Referring to the drawing, 1 represents a cylindrical housing closed at its lower end and provided adjacent such lower end with a plurality of ventilating holes 2. In the base of the housing 1 is fitted a lamp socket 3 accommodating an incandescent lamp 4, the electrical connections from which extend internally of socket 3 and through the base of the housing. Current is supplied to lamp 4 through a variable transformer 5 fed by power, for example, 110 volt A. C. from lines 6 and 7. A volt meter 8 is shunted across the output lines of the transformer, so that the voltage supplied to lamp 4 may be determined and adjusted to produce light of substantially constant intensity.

The upper portion of the wall of housing 1 is recessed at 9 forming an internal horizontal shoulder 10. Vertically slidable in recess 9 is cylindrical sleeve or ring holder 11 which is also recessed at its lower end, as at 12, to hold the oil ring 13 which is to be examined for plugging. The diameter of the recess 12 in the ring holder 11 is of such size that the oil ring, which being a split ring, will expand and be firmly held in recess 12. The cylindrical ring holder 11 is manually rotatable in the recess 9 of housing 1. The oil ring 13 is provided with a plurality of apertures 14 extending through the wall thereof, such apertures being rectangular slots, as shown, or in other case, of circular cross section.

In the wall of housing 1, slightly above the horizontal shoulder 10, is provided a rectangular opening 15 of such dimensions as to pass all of the light transmitted through the oil ring aperture 14. Affixed to the outer wall of housing 1 and surrounding the opening 15 is an adaptor comprising a fixed casing or tube 16 about which is slidably fitted a second casing or tube 17 carrying a light-measuring means 18 such as a photographic exposure meter (light intensity meter), or a photoelectric cell electrically connected to a microammeter. As shown in Figure 2, the light meter is provided with a dial 19 and pointer 20, such dial being calibrated, for example, in foot-candles, or other suitable units. Since the apparatus of the present invention is designed for determining the amount or percentage of ring plugging, it is of little consequence as to what units are employed in the calibration of the dial.

The ring holder 11 may be provided about its circumference, above the top of housing 1, with indicator numerals (not shown) corresponding in position and number with the apertures 14 in the oil ring 13, so that upon assembling the apparatus, the bringing of the apertures 14 successively into alignment with opening 15 will be rendered more easy. It is to be understood, of course, that the diameter of the ring holder 11 and recess 12 may be varied to accommodate oil rings of different diameters. In those rings which are provided with apertures of circular cross section in lieu of rectangular slots, it is possible to align a plurality of such circular apertures with the opening 15, and thus simultaneously determine the total light transmitted by the plurality of apertures.

The operation of the apparatus in determining the percentage ring plugging is as follows:

The ring holder 11 is removed from the housing 1, and an oil ring taken from the piston of a dismantled engine is inserted in the recess 12 of the ring holder. The holder is then inserted in the housing 1 until the oil ring seats on the shoulder 10 of the housing. Current is supplied to lamp 4 via the variable transformer, and one of the oil ring apertures 14 is brought into alignment with opening 15 in housing 1 by suitable rotation of the ring holder 11. If the oil ring aperture is not completely blocked by engine sludge or foreign carbonaceous matter, light from lamp 4 will be transmitted through the unblocked portion of the oil ring aperture, and thence through opening 15 and adaptor tubes 16 and 17 into the light meter 18. The amount of light transmitted is inversely proportional to the amount of aperture blockage, and the light which reaches the light meter will cause the pointer 20 to move across the calibrated dial 19 to a position indicative of the amount or intensity of the light transmitted. This value is noted, and the ring holder is then rotated until the next oil ring aperture is aligned with opening 15 and a reading is made. This procedure is repeated until readings for all of the apertures have been made. The ring holder 11 is then withdrawn from housing 1 and the oil ring is removed. The ring and all of the apertures are then thoroughly cleaned with a solvent or solvent mixture, for example, gasoline, benzene, pyridine, alcohol, acetone, or the like, with recourse if necessary to a brush or other scraping device. The cleaned ring is then tested in the manner above described, the apertures 14 giving complete transmission of light and the values being noted on the light meter. In accordance with the invention, the individual value for each aperture of the used ring and the cleaned ring may be compared, or the sum of the values for all of the apertures of the used ring and the cleaned ring may be compared.

In any case, the percentage ring plugging may be obtained by dividing the individual or the collective values for the used (blocked or partially blocked) ring by the individual or the collective values for the cleaned ring. Where somewhat less accuracy is acceptable, the values for the used ring may be compared with the values for a new or unused ring of the same dimensions.

We claim:

1. The method of determining the degree of plugging of drain holes in internal combustion engine oil rings caused by the deposition of carbonaceous materials therein, which comprises directing a beam of light in a radial direction against the interior surface of said oil ring provided with a drain hole containing carbonaceous materials, directing the light transmitted in a desired path, transforming the light energy in the path into a corresponding electrical current proportional to the intensity of the light, indicating the value of the electrical current, removing all deposited matter from said oil ring hole, repeating the steps of directing the light through the clean drain hole, transforming the light energy into electrical current and indicating the value of the electrical current.

2. Apparatus for determining the degree of plugging of drain holes in internal combustion engine oil rings caused by the deposition of carbonaceous materials therein, which comprises a cylindrical housing closed at one end, a concentric recess in the inner wall of said housing and terminating in a horizontal shoulder, an opening in the wall of said housing immediately above said shoulder, a light source axially disposed within said housing in a plane normal to the axis of said housing and passing through said opening, a cylindrical adaptor slidably fitted and rotatable in the recessed portion of said housing, a shouldered recess in one end of said adaptor to accommodate an oil ring provided with a drain hole, a light-directing means affixed to the outer wall of said housing in line with the opening in the wall thereof, and a light sensitive means positioned on the light-directing means facing the opening in the wall for determining the intensity of the light passing through the oil ring drain hole and said housing wall opening.

3. Apparatus for determining the degree of plugging of drain holes in internal combustion engine oil rings caused by the deposition of carbonaceous materials therein, which comprises a cylindrical housing closed at one end, a concentric recess in the inner wall of said housing and terminating in a horizontal shoulder, an opening in the wall of said housing immediately above said shoulder, a light source axially disposed within said housing in a plane normal to the axis of said housing and passing through said opening, a cylindrical adaptor slidably fitted and rotatable in the recessed portion of said housing, a shouldered recess in one end of said adaptor to accommodate an oil ring provided with a drain hole, and a light-sensitive means supported on the outer wall of the housing facing the opening in the wall for determining the intensity of the light passing through the oil ring drain hole and said housing wall opening.

JAMES W. SAVIN.
JOHN H. NEITHAMMER.

REFERENCES CITED

The following references are of record in the file of this patent:

UNITED STATES PATENTS

| Number | Name | Date |
|---|---|---|
| 1,455,864 | Busick | May 22, 1923 |
| 1,501,856 | Lee | July 15, 1924 |
| 2,241,743 | Schoene | May 13, 1941 |
| 2,294,511 | Neiman | Sept. 1, 1942 |
| 2,310,111 | Nordlander | Feb. 2, 1943 |
| 2,345,535 | Horner | Mar. 28, 1944 |
| 2,355,014 | Schorn | Aug. 1, 1944 |
| 2,386,320 | Kott | Oct. 9, 1945 |
| 2,433,558 | Hurley | Dec. 30, 1947 |
| 2,441,343 | Becker | May 11, 1948 |